United States Patent
Glenn

(10) Patent No.: US 12,084,223 B2
(45) Date of Patent: Sep. 10, 2024

(54) SELF-FILLING, SELF-SEALING CONTAINER SYSTEM

(71) Applicant: Steven E. Glenn, Wake Forest, NC (US)

(72) Inventor: Steven E. Glenn, Wake Forest, NC (US)

(73) Assignee: Steven E. Glenn, Wake Forest, NC (US)

( * ) Notice: Subject to any disclaimer, the term of this patent is extended or adjusted under 35 U.S.C. 154(b) by 416 days.

(21) Appl. No.: 17/606,656

(22) PCT Filed: Apr. 26, 2020

(86) PCT No.: PCT/US2020/029996
§ 371 (c)(1),
(2) Date: Oct. 26, 2021

(87) PCT Pub. No.: WO2020/220008
PCT Pub. Date: Oct. 29, 2020

(65) Prior Publication Data
US 2022/0204207 A1 Jun. 30, 2022

Related U.S. Application Data

(60) Provisional application No. 62/839,504, filed on Apr. 26, 2019.

(51) Int. Cl.
*B65D 1/20* (2006.01)
*A47G 19/22* (2006.01)
(Continued)

(52) U.S. Cl.
CPC ............ *B65D 1/20* (2013.01); *A47G 19/2205* (2013.01); *B65D 1/06* (2013.01); *B65D 25/28* (2013.01);
(Continued)

(58) Field of Classification Search
CPC .......... B65D 1/20; B65D 1/06; B65D 83/425; A47G 19/2205; B67D 1/0805
(Continued)

(56) References Cited

U.S. PATENT DOCUMENTS 1,557,823 A    10/1925   Frattallone
2,476,545 A     7/1949   Hayward
(Continued)

FOREIGN PATENT DOCUMENTS

CN    201731910 U    2/2011
CN    102466503 A    5/2012

*Primary Examiner* — Nathan J Jenness
*Assistant Examiner* — Jennifer Castriotta
(74) *Attorney, Agent, or Firm* — Coats & Bennett, PLLC

(57) ABSTRACT

A container system that includes a container element with a hole or series of holes that are sealed by at least one seal assembly with at least one seal element. When the container system is placed into material to be captured, the seal element of the seal assembly is displaced from the holes when material exerts inward pressure on the seals, allowing the container system to self-fill with material. Once the desired amount of material is captured, the container system is removed and captured material exerts outward pressure on the seal assembly, causing the seal element to close the holes and the container system to self-seal.

13 Claims, 6 Drawing Sheets

(51) Int. Cl.
  *B65D 1/06* (2006.01)
  *B65D 25/28* (2006.01)
  *B65D 25/56* (2006.01)
  *B65D 83/42* (2006.01)
  *B67D 1/08* (2006.01)

(52) U.S. Cl.
  CPC ........... *B65D 25/56* (2013.01); *B65D 83/425* (2013.01); *B67D 1/0805* (2013.01)

(58) Field of Classification Search
  USPC .................................... 141/113; 220/203.17
  See application file for complete search history.

(56) References Cited

U.S. PATENT DOCUMENTS

| | | | |
|---|---|---|---|
| 3,062,152 A | 11/1962 | Huff | |
| 3,994,522 A * | 11/1976 | Hinshaw | A47J 43/28 |
| | | | 220/203.16 |
| 4,401,224 A * | 8/1983 | Alonso | A61J 9/04 |
| | | | 137/511 |
| 5,421,631 A | 6/1995 | Murray | |
| 5,433,353 A * | 7/1995 | Flinn | B65D 51/1672 |
| | | | 222/206 |
| 6,076,699 A | 6/2000 | Seager et al. | |
| 6,446,822 B1 * | 9/2002 | Meyers | A61J 9/001 |
| | | | 215/11.5 |
| 7,766,057 B2 * | 8/2010 | Windmiller | B67D 1/0081 |
| | | | 141/2 |
| 8,317,064 B2 * | 11/2012 | Pang | B65D 37/00 |
| | | | 222/481 |
| 8,763,655 B2 * | 7/2014 | Springer | B67D 1/1275 |
| | | | 141/2 |
| 9,016,333 B2 * | 4/2015 | Shaffer | E03B 9/20 |
| | | | 141/113 |
| 9,476,748 B1 | 10/2016 | Krause et al. | |
| 9,517,923 B2 * | 12/2016 | Al-Hakim | B67D 1/10 |
| 9,957,149 B2 * | 5/2018 | Park | B67D 1/0894 |
| 2008/0223478 A1 | 9/2008 | Hantsoo et al. | |
| 2009/0294318 A1 | 12/2009 | Monahan | |
| 2010/0043911 A1 * | 2/2010 | Russell | B67D 1/04 |
| | | | 141/113 |
| 2020/0154915 A1 * | 5/2020 | Song | B65D 81/38 |

* cited by examiner

SELF-FILLING, SELF-SEALING CONTAINER SYSTEM

CROSS-REFERENCE TO RELATED APPLICATIONS

This application claims the benefit of Provisional Application No. 62/839,504, filed Apr. 26, 2019, the disclosures of which are incorporated herein by reference.

TECHNICAL FIELD OF THE INVENTION

The present disclosure relates generally to containers, and more specifically, to a self-filling, self-sealing container system designed to capture and remove materials from places that are otherwise difficult to access with standard bailing techniques.

BACKGROUND

Containers such as buckets and pails are known and often used for scooping, holding, and transporting various materials such as fluids, solids, or combinations thereof. Buckets are generally filled from the top, either by pouring material into the bucket from another container or by tipping and dipping the bucket into a material, causing the material to flow into or to be scooped into the bucket.

Removing material from a space or another container with a bucket generally requires either significant force to fully submerge the bucket while it remains in an upright position or a space large enough to allow the bucket to tip to the side.

Previous solutions have been proposed in patents directed toward devices used for bailing water and other related uses. U.S. Pat. Nos. 1,333,793 and 3,994,522 are illustrative of buckets containing check valves or valve flaps fixed into the bottom of the bucket to allow water to pass into the bucket and be captured from below. However, no satisfactory solution has been developed to easily remove materials from a space using a container with a simple, durable, and scalable system that is cost-effective, easy to repair, and easy to transport.

BRIEF SUMMARY OF THE INVENTION

The present invention is directed to a self-filling, self-sealing container system. The container system includes a container element with an interior cavity. The container system also includes at least one hole or a series of holes through the container element to the interior cavity that are sized and arranged in pattern and number to allow maximum flow of a material into the container system while maintaining structural integrity of the system when it is placed into and removed from various materials.

At least one seal assembly is affixed to the container element. The seal assembly may be positioned anywhere on the container element. A seal assembly comprises at least one seal element capable of sealing at least one hole through the container element. Upon sufficient inward pressure exerted by materials located outside of the container system, at least one element of the seal assembly is displaced to an unsealed position, simultaneously allowing material to enter the interior cavity through at least one hole located on the container element. When materials are no longer entering the interior cavity, sufficient outward pressure of the materials within the interior cavity causes the seal assembly to return to a sealed position, closing at least one hole.

Additional features and advantages of the invention will be set forth in the description which follows, and in part will be obvious from the description, or may be learned by the practice of the invention. The invention is not limited in its application to the details of construction and to the arrangements of the components set forth in the following description or illustrated in the drawings.

DETAILED DESCRIPTION OF THE INVENTION

The present invention relates to a self-filling, self-sealing container system that may be used generally to easily remove material from a space without the requirement of a pump, siphon, or scoop. The container system of the present invention contains at least one seal assembly capable of closing at least one hole located anywhere on the container element. When the container system of the present invention is placed into a material, the material enters into the interior cavity of the container element through the holes by displacing at least one seal element of the seal assembly into an unsealed position through exertion of sufficient inward pressure against the seal assembly.

Once material has entered into the interior cavity of the container element, the container system may be removed from the material, and the resulting outward pressure of captured material returns the seal assembly to its sealed position, thereby closing at least one hole located in the container element to allow the captured material to remain within the interior cavity of the container element until poured out or otherwise removed. It should be noted that, although the container system may be operated without the requirement of a pump or siphon, it may be used in conjunction with either a pump or siphon or both. For example, a pump or siphon may be used to remove captured material from the container.

Figure 1:
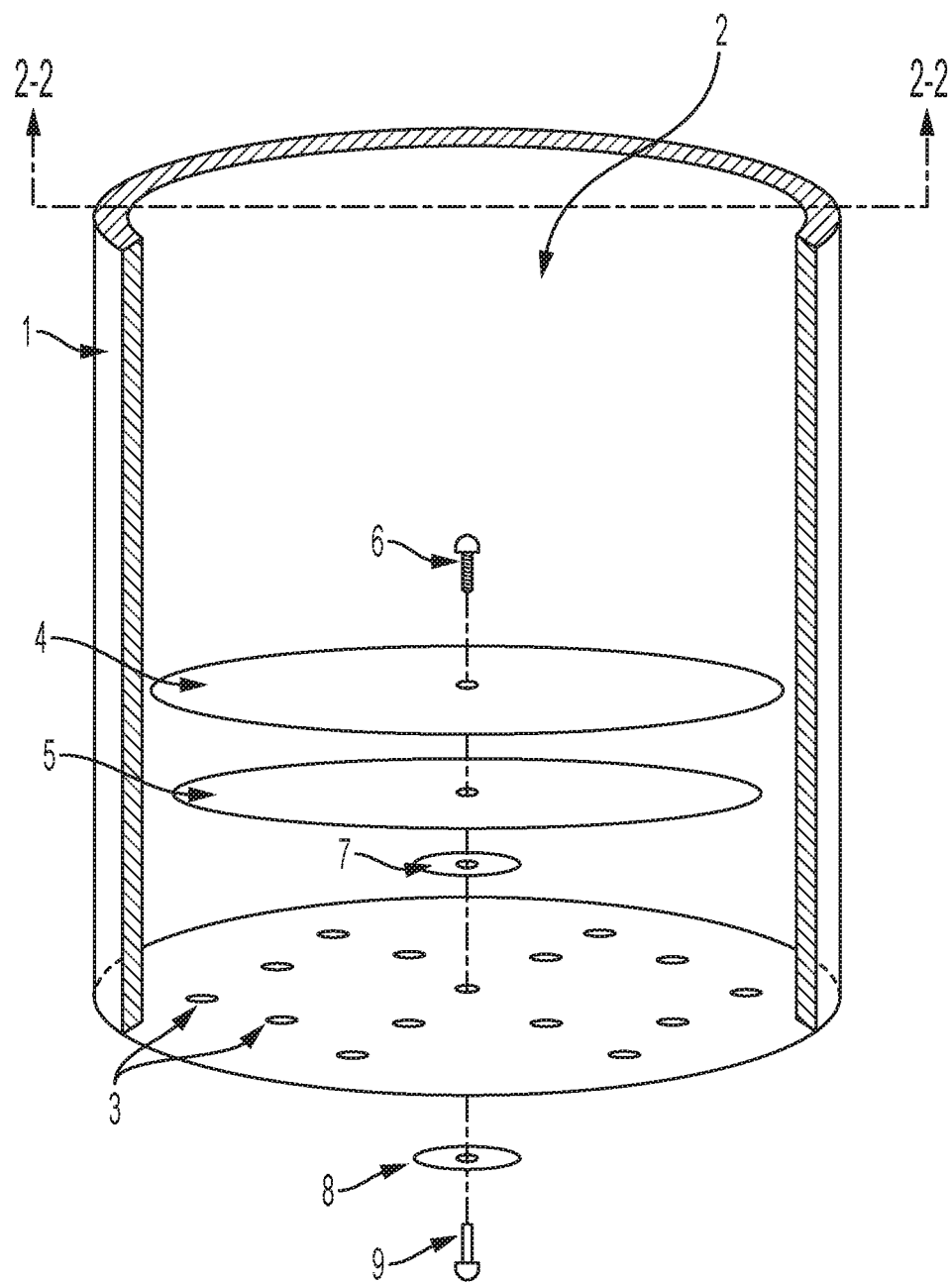
FIG. 1 is an upper-perspective, cutaway view of a self-filling, self-sealing container system according to one embodiment of the present invention.
Figure 4:
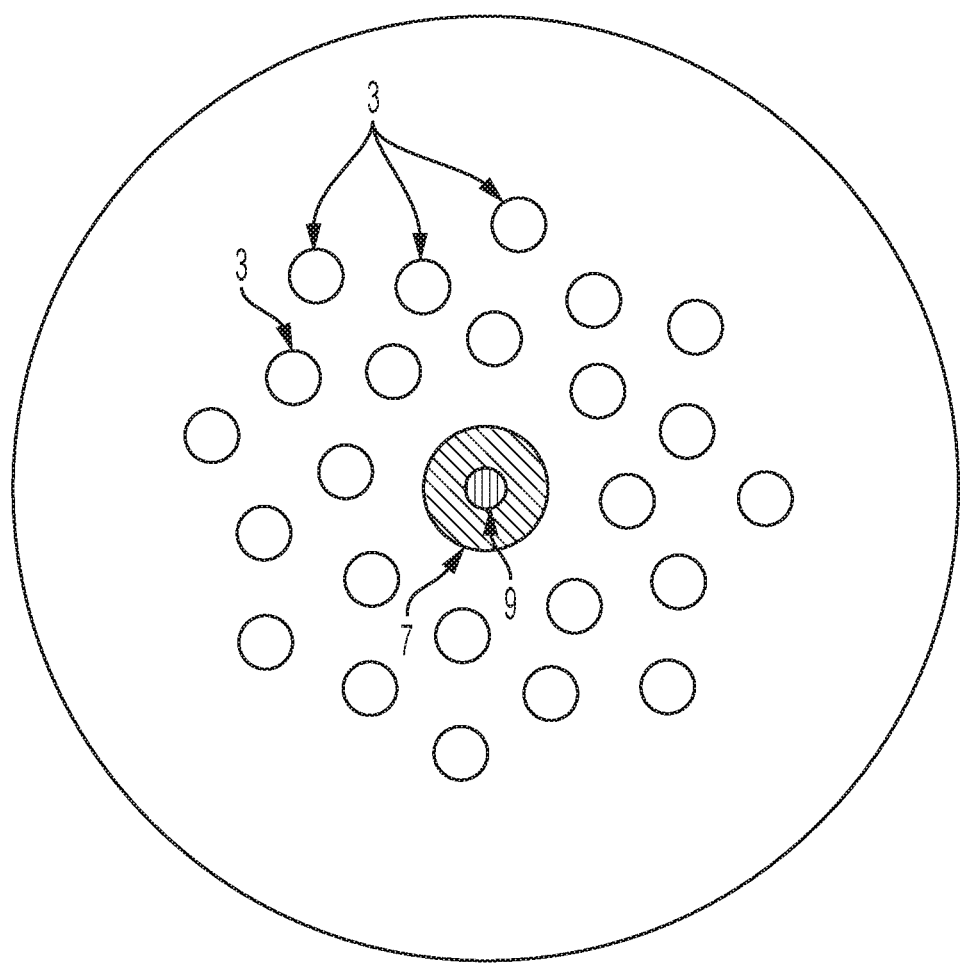
FIG. 4 is a bottom view of the container system of FIG. 1.

FIG. 1 illustrates one embodiment of the present invention comprising a tubularly shaped container element 1 with interior cavity 2. The container element 1 is modified to include a number of holes 3, arranged in size and pattern to allow maximum flow of a fluid or material through the holes 3 without compromising the structural integrity of the container element 1. The seal assembly of the preferred embodiment of the present invention as illustrated in FIG. 1 comprises an upper seal element 4 and lower seal element 5. FIG. 4 illustrates a pattern of holes 3 suitable for one embodiment of the present invention. The holes 3 in the container element 1 are sized to keep undesirable particles from entering through the container element 1 into the interior cavity 2 and potentially blocking lower seal element 5 from closing over holes 3. In another embodiment, holes 3 can be located anywhere in the container element 1, including in such a way as to allow a specific amount or type of material to remain uncaptured. Size and placement of holes 3 may depend on the types, weights, and amounts of material or materials to be captured, the speed at which the material or materials are to be captured, the environmental conditions in which the materials will be captured, transfer of captured material, or extended storage of captured materials.

The container element of the preferred embodiment of the present invention is formed from a commercial or engineering-grade polymer. Other materials are available that would be suitable for use on their own or together with other materials for the container element in alternative embodiments of the present invention. The types of material used to form the container element of the present invention may depend on the types, weights, and amounts of material or materials to be captured, the environmental conditions in which the materials will be captured, transfer of captured material, or extended storage of captured materials. Examples of suitable materials are metal, wood, bamboo, ceramic, glass, polymers, or composite materials such as carbon fiber, or fiberglass, or any other similar materials. Those in the art will understand that any suitable material, now known or hereafter developed, may be used in forming the container element of the container system described herein.

Figure 6:
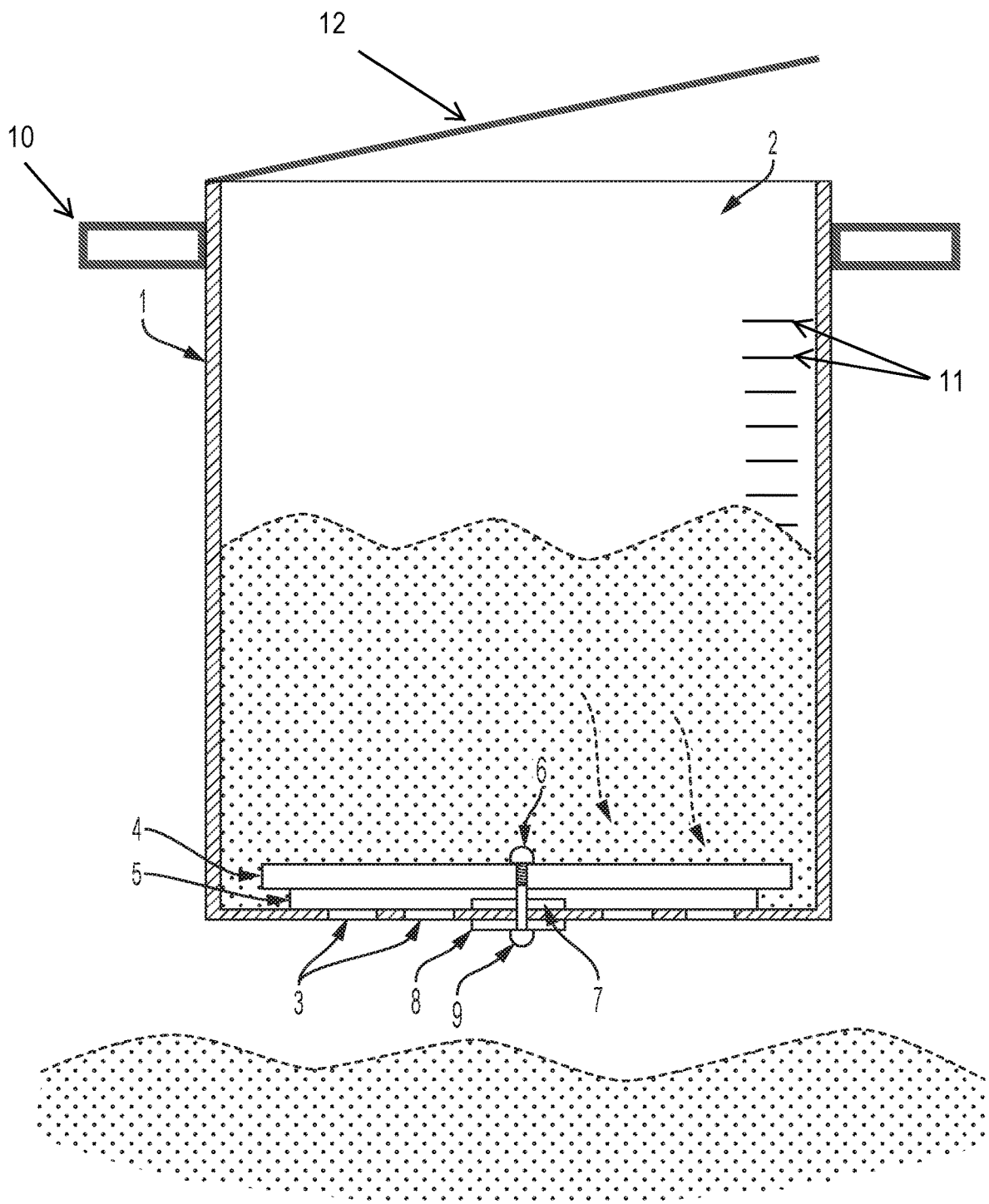
FIG. 6 is a cross-sectional view of the container system of FIG. 1 taken along line 2-2 of FIG. 1 showing the container system with captured material within the interior cavity of the container system after the container system has been removed from uncaptured material of FIG. 5 and the outward pressure of captured material returns the seal assembly to its sealed position.

The container element of the preferred embodiment of the present invention as illustrated in FIG. 6 is equipped with at least one handle 10 for lowering and raising the container system into and out of the material to be captured, and at least one lid 12. In another embodiment of the present invention, the container element may be made of a material with greater density or weight than the material in which it will be placed so that the system, with or without any type of handle, will sink into the material without application of downward force. In yet another embodiment of the present invention, one or more handles, grips, or cavities for hooking may be located on the container system for additional manner of lifting and moving the container element. In yet another embodiment of the present invention, one or more lids or coverings may be permanently or removably affixed on the container to prevent objects from entering the interior cavity of the container element or to allow for pressurization and depressurization of the interior cavity.

The preferred embodiment of the present invention includes molded graduation lines 11 as illustrated in FIG. 6 along any surface of the container system for accurate measuring so that a user may quickly identify the amount of material captured by the container system at any given time. In alternative embodiments of the present invention, other measuring methods are available that would be suitable, on their own or together with other methods, for measuring captured materials, surrounding materials, or other relevant data related to the present invention, including the remaining unfilled volume of the container or the pressure within or outside of the container for example. Examples of suitable methods could include mechanical or digital scales, floats, hydrostatic devices, load cells, magnetic level gauges, capacitance transmitters, laser level transmitters, ultrasonic level transmitters, radar level transmitters, pressure sensors, or other similar methods. Those in the art will understand that any suitable method, now known or hereafter developed, may be used for measuring captured material within the container system described herein.

Figure 2:
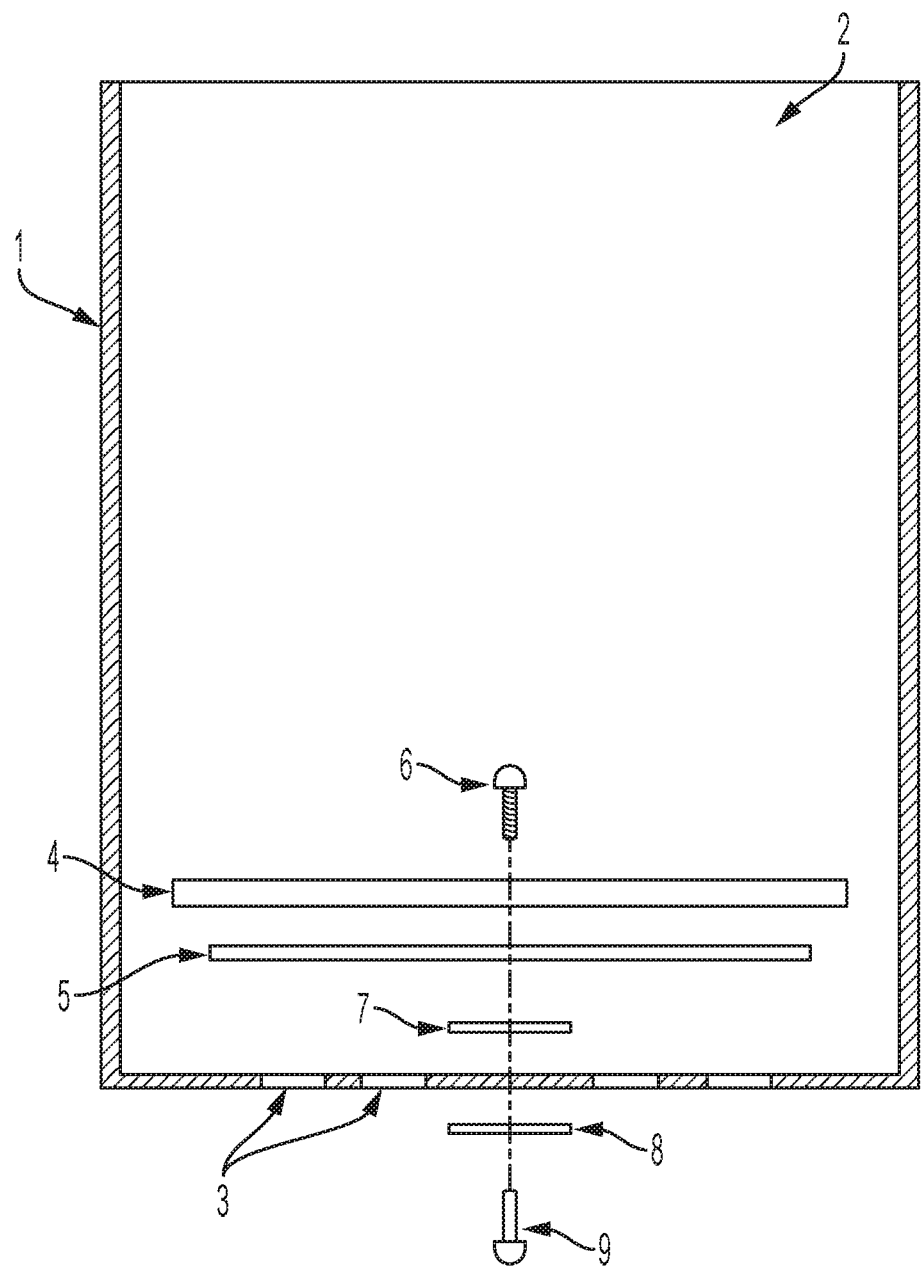
FIG. 2 is a cross-sectional view of the container system of FIG. 1 taken along line 2-2 of FIG. 1.

In the embodiment of the present invention depicted in FIGS. 1-6, a seal assembly combining an upper seal element 4 and lower seal element 5 is affixed to container element 1 against washer 7 within the interior cavity 2 of container element 1 using connector screw 6, which passes through container element 1 and fits into screw sleeve 9. Screw sleeve 9 secures said seal assembly from the outside of container element 1 against washer 8. FIG. 2 provides a vertical sectional view of the seal assembly within the container system of FIG. 1 along line 2-2 of FIG. 1. In another embodiment, the seal assembly is affixed to the container by any suitable non-corrosive, sealable means now known or hereafter developed. Examples may include rivets, bolts with nuts, suction cups, or other similar methods, whether removable or permanent. In yet another embodiment, not illustrated, a single seal assembly coincides to a single hole 3 in the container element 1. In yet another embodiment, seal assemblies are removably or permanently affixed to the container element 1 in the center of the holes 3. Examples of removable or permanent seal assemblies in other embodiments may include other types of one-way valves such as ball and cage valve, tilting disc valve, or bileaflet valve, but those in the art will understand that any one-way valve, now known or hereafter developed, may be used in forming the seal assembly of the present invention.

The preferred embodiment of the present invention includes a seal assembly with an upper seal element 4 and lower seal element 5 affixed to the container element, varied in texture with respect to mated surfaces such that surface adhesion may be reduced, and at least equal in diameter. It should be acknowledged that the diameter of the upper seal element of the present invention as described by the preferred embodiment could also be smaller than the diameter of the lower seal element. In another embodiment, more than one seal assembly is affixed to the container element 1 of the present invention to accommodate specific applications, for example, use of a large container element, increased spacing between holes in the container element, or placement of holes at an angle other than the surface angle of material to be collected.

A non-corrosive material or coating such stainless steel or zinc, respectively, or other material or coating as desired for the particular application, can be used for connector screw 6, washer 8, and screw sleeve 9 of the preferred embodiment to resist damage from a wide range of materials to which the present invention might be exposed. A resilient, yet flexible material such as neoprene rubber, or other as desired for the particular application, for example flexible polymer or other flexible and sealing material, can be used for upper seal element 4, lower seal element 5, and washer 7 of the preferred embodiment to not only provide effective sealing of holes through container element 1, but to also provide resistance against damage from a wide range of materials and tolerance against a wide range of temperatures and percentages of humidity to which the present invention might be exposed.

The types of materials used for connector screw 6, washer 8, screw sleeve 9, upper seal element 4, lower seal element 5, and washer 7 of the preferred embodiment may depend on the types, weights, and amounts of material to be captured, the environmental conditions in which the materials will be captured, whether the materials will be transferred upon capture, or whether the material will be stored for extended periods upon capture. Those in the art will understand that any suitable material, now known or hereafter developed, may be used in forming elements of the container system described herein.

Figure 3:
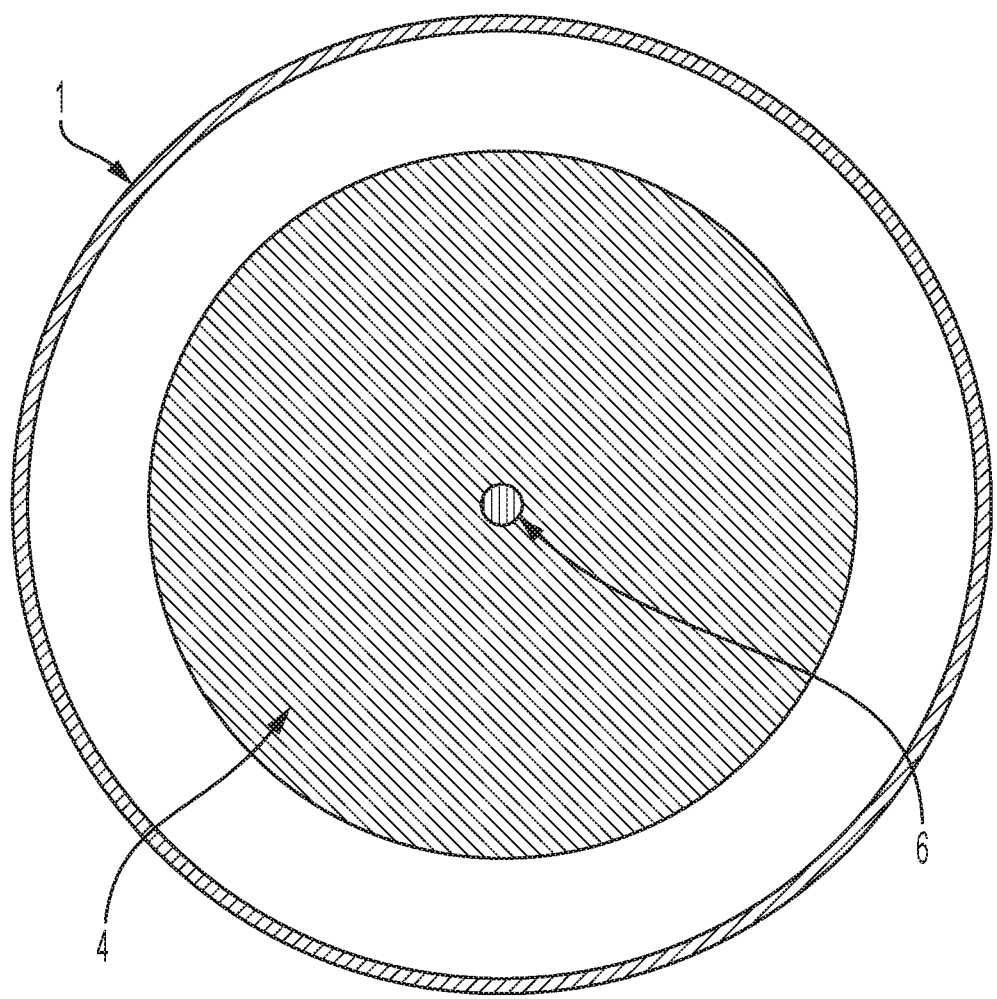
FIG. 3 is a top view of the container system of FIG. 1.

Lower seal element 5 of the preferred embodiment is as thin and pliable as required to seal and unseal holes 3 in the container element 1 by quickly and easily closing and opening the holes 3 upon exertion of pressure from various materials. Upper seal element 4 of the preferred embodiment is also thin and pliable enough to allow quick and easy closing and opening of holes 3 in container element 1 upon exertion of pressure from various materials, but is thicker and less pliable than lower seal element 5 to both protect lower seal element 5 from damage and provide support as pressure increases against the seal assembly or as pressure is exerted against the seal assembly over extended periods of time. In the embodiment depicted in FIGS. 1-6, the lower seal element 5 is large enough in diameter to cover all holes 3 in the container element 1, and upper seal element 4 is large enough in diameter to cover lower seal element 5 as illustrated in FIG. 3, which shows a top view of this embodiment.

Those in the art will understand that different surface compositions and ratios of thickness between seal elements will be suitable for application depending on the material used for seal elements within the seal assembly, adhesive properties and electrostatic forces of the seal material, the material intended to be captured, and the types of undesirable particles that may be present in or near material to be captured. Both seal elements of the seal assembly of the preferred embodiment should remain pliable enough to be displaced into a sealed or unsealed position upon exertion of sufficient pressure by the type of material to be captured. The upper seal element element of the preferred embodiment should be thick enough to protect the lower seal element against damage and to supply strength for the lower seal element as pressure against the seal elements increases or exists over extended periods of time. The lower seal element of the preferred embodiment should be thin enough to quickly and effectively seal holes upon sufficient outward pressure from captured material or lack of inward pressure from material.

Figure 5:
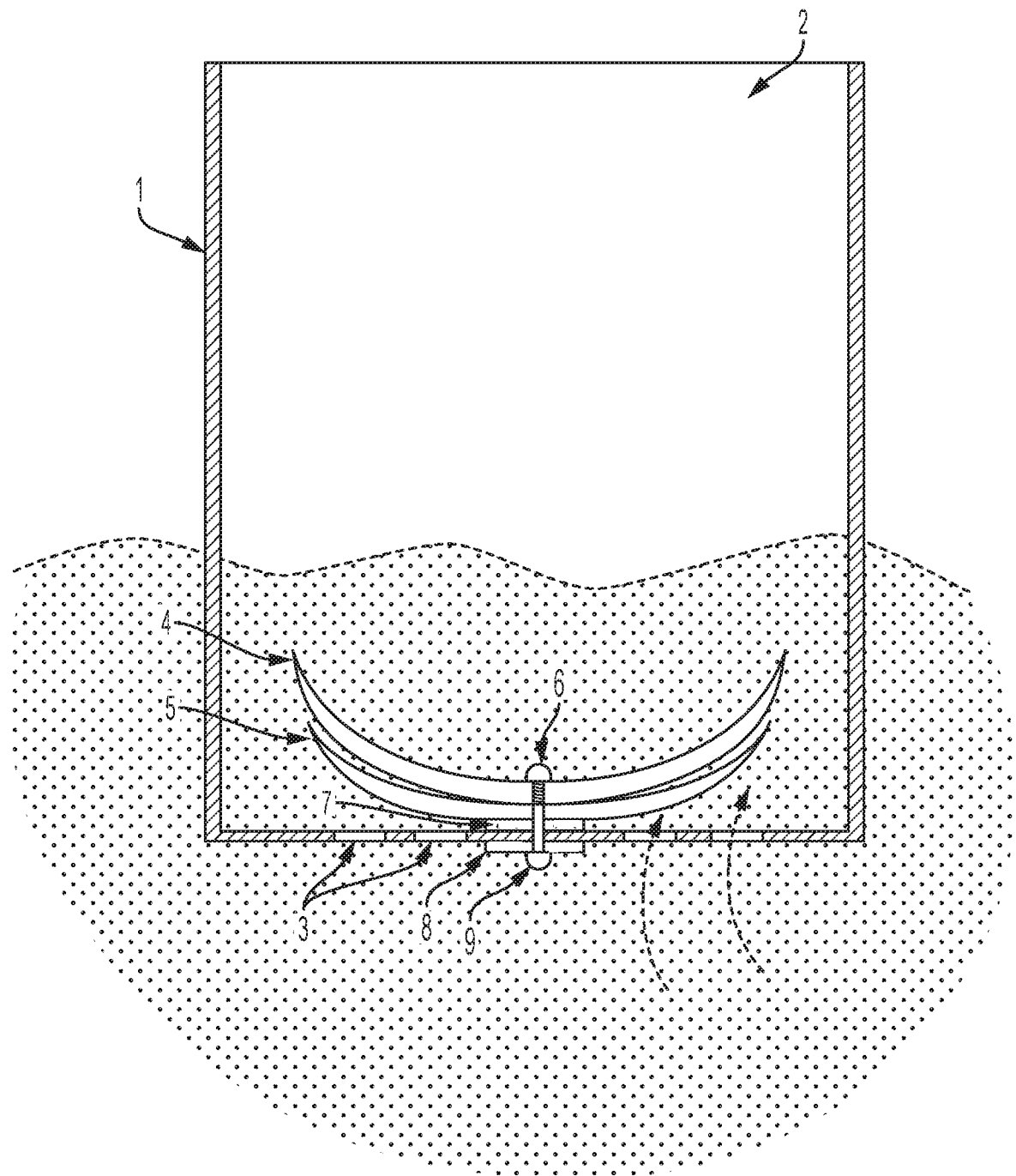
FIG. 5 is a cross-sectional view of the container system of FIG. 1 taken along line 2-2 of FIG. 1 showing the container system placed in a material with material entering into the interior cavity of the container system and displacing elements of the seal assembly.

When the preferred embodiment, depicted in FIGS. 1-6, is pushed or sinks into material, the pressure exerted by the material through holes 3 in container element 1 cause the seal elements of the seal assembly to be displaced to an unsealed position, allowing the container to flood as depicted in FIG. 5, specifically. Once the desired amount of material has entered the container, the user may remove the container from the material to be captured. When the container is removed, as shown in FIG. 6, the pressure exerted against the seal assembly by captured material causes upper seal element 4 and lower seal element 5 to close over and seal the holes 3 in the container element 1, allowing the captured fluid or material to remain captured or to be moved.

The invention claimed is:

1. A container system comprising:
   a container element;
   at least one hole through the container element; and
   a seal assembly, affixed to the container element, the seal assembly comprising a lower seal element and an upper seal element that are used for opening and closing the at least one hole;
   wherein both the upper seal element and the lower seal element are pliable;
   wherein the lower seal element bends to unseal the at least one hole upon exertion of pressure through the at least one hole; and
   wherein the upper seal element bends less pliably than the lower seal element to support the lower seal element as the pressure increases.

2. The container system of claim 1, further comprising graduation lines enabling measurement of container system contents.

3. The container system of claim 1, further comprising a handle.

4. The container system of claim 1, further comprising a lid.

5. The container system of claim 1, wherein the seal assembly comprises a one-way valve.

6. The container system of claim 1, wherein the upper seal element is adjacent to the lower seal element.

7. The container system of claim 1, wherein the upper seal element and lower seal element are concentric.

8. A container system comprising:
   a container;
   at least one hole through the container; and
   a seal assembly, affixed to the container, with means for sealing the at least one hole;
   wherein the means for sealing comprises an upper seal element and a lower seal element;
   wherein the upper seal element and lower seal element are pliable and are displaceable independently of each other; and
   wherein the upper seal element supports the lower seal element as pressure through the at least one hole increases.

9. The container system of claim 8, further comprising means for measuring data related to the container system.

10. The container system of claim 8, further comprising a handle.

11. The container system of claim 8, further comprising a lid.

12. The container system of claim 8, wherein the upper seal element is adjacent to the lower seal element.

13. The container system of claim 8, wherein the upper seal element and lower seal element are concentric.

* * * * *